(12) United States Patent
Hak et al.

(10) Patent No.: US 10,104,831 B2
(45) Date of Patent: Oct. 23, 2018

(54) UNIVERSAL SEED METERING DISC

(71) Applicant: David Jason Hockemeyer, Hoagland, IN (US)

(72) Inventors: Larry Hak, Convoy, OH (US); Dallis Gibson, Convoy, OH (US); Trevor Gibson, Convoy, OH (US)

(*) Notice: Subject to any disclaimer, the term of this patent is extended or adjusted under 35 U.S.C. 154(b) by 0 days.

(21) Appl. No.: 15/161,733

(22) Filed: May 23, 2016

(65) Prior Publication Data

US 2016/0338261 A1    Nov. 24, 2016

Related U.S. Application Data

(60) Provisional application No. 62/164,901, filed on May 21, 2015.

(51) Int. Cl.
*A01C 7/04* (2006.01)
*A01C 7/20* (2006.01)
*A01C 7/12* (2006.01)

(52) U.S. Cl.
CPC .............. *A01C 7/046* (2013.01); *A01C 7/128* (2013.01)

(58) Field of Classification Search
CPC .......... A01C 7/121; A01C 7/128; A01C 7/046
USPC ...................... 111/183–185; 221/211; D15/28
See application file for complete search history.

(56) References Cited

U.S. PATENT DOCUMENTS

| | | | | |
|---|---|---|---|---|
| 3,796,346 A | * | 3/1974 | Ribouleau | A01C 7/046 111/185 |
| 4,949,869 A | * | 8/1990 | Ribouleau | A01C 7/046 111/77 |
| 5,058,766 A | * | 10/1991 | Deckler | A01C 7/046 111/184 |
| 5,392,707 A | * | 2/1995 | Romans | A01C 7/046 111/177 |
| 6,044,779 A | * | 4/2000 | Brown | A01C 7/128 111/185 |
| 6,176,393 B1 | * | 1/2001 | Luxon | A01C 7/046 111/185 |
| 6,634,522 B2 | | 10/2003 | Hak | |
| 7,083,067 B2 | | 8/2006 | Hak | |
| 2015/0250093 A1 | * | 9/2015 | Scheideler | A01C 7/20 111/184 |
| 2015/0351314 A1 | * | 12/2015 | Sauder | A01C 7/046 700/275 |

FOREIGN PATENT DOCUMENTS

GB           2057835 A  *  4/1981

* cited by examiner

*Primary Examiner* — John Weiss

(57) ABSTRACT

An exemplary seed metering system for the distribution of various sizes of seeds comprises a seed meter and a metering disc. The metering disc has one or more pockets, and each pocket has at least two openings. The pockets are configured to receive at least two different seed types.

20 Claims, 8 Drawing Sheets

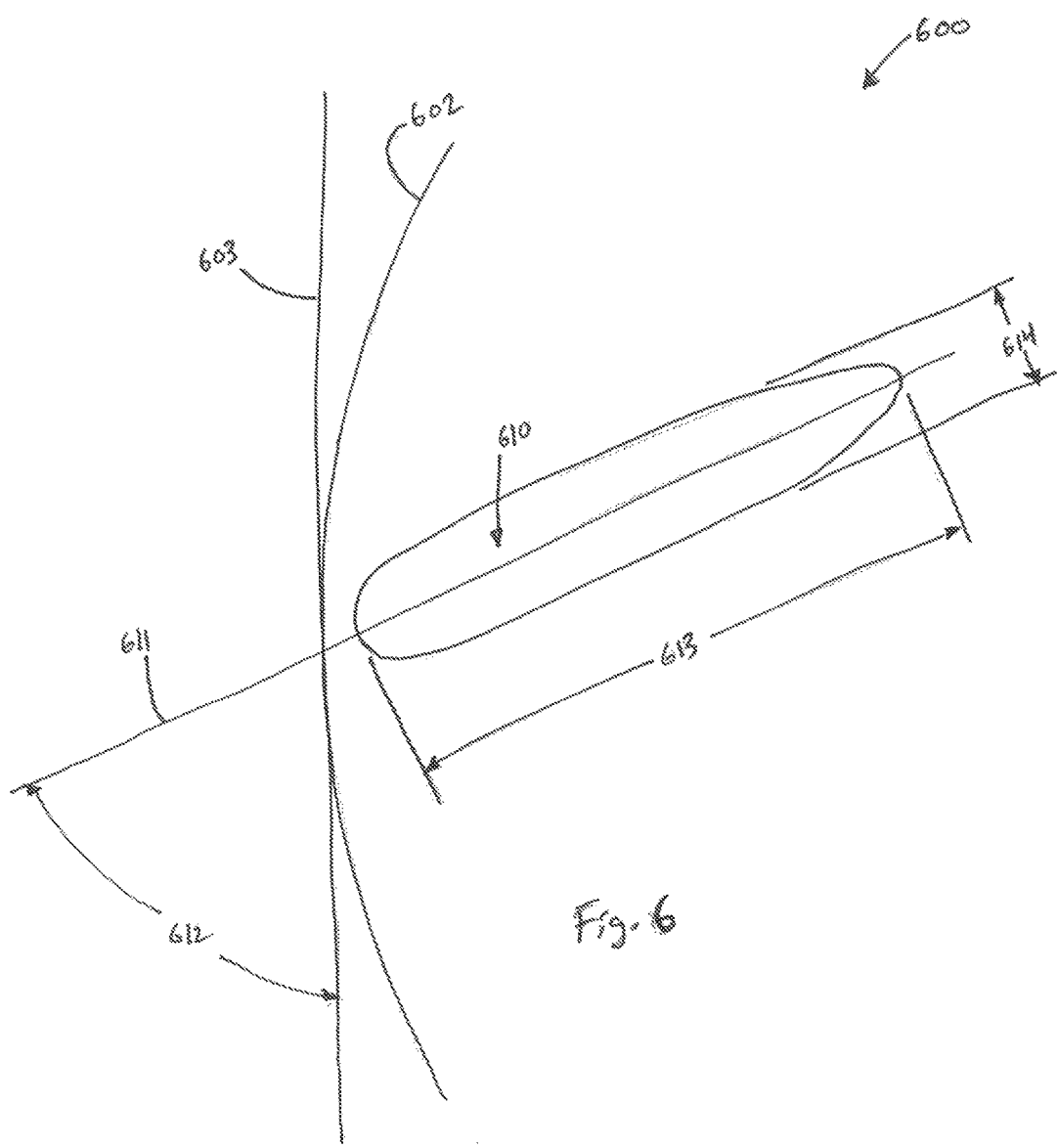

UNIVERSAL SEED METERING DISC

RELATED APPLICATIONS

The application claims priority to, and the benefits of, U.S. patent application Ser. No. 62/164,901, filed on May 21, 2015 and titled Universal Seed Metering Disc, which is incorporated herein by reference in its entirety.

TECHNICAL FIELD

The present invention relates generally to seed metering systems, and in particular to vacuum seed meters.

BACKGROUND OF THE INVENTION

Seed metering systems, such as brush-type, finger pickup, and vacuum seed meters, distribute seeds at predetermined intervals during the planting of a field. Prior seed metering discs are disclosed in U.S. Pat. Nos. 6,634,522 and 7,083,067 filed on Sep. 14, 2001 and entitled Universal Seed Metering Disc, both of which are incorporated herein by reference in their entirety.

SUMMARY

Exemplary embodiments of seed metering systems and seed metering discs capable of dispensing a variety of seed types are disclosed herein.

In one exemplary embodiment, a seed metering system comprises a seed meter and a metering disc. The metering disc has one or more pockets, and each pocket has one or more openings. The pockets are configured to receive at least two different seed types.

An advantage of the present invention is that seeds of varying sizes and types may be planted by one metering disc or one set of metering discs. Still further advantages of the present invention will become apparent to those of ordinary skill in the art upon reading and understanding the following detailed description of embodiments of the present invention.

BRIEF DESCRIPTION OF THE DRAWINGS

These and other features and advantages of the present invention will become better understood with regard to the following description and accompanying drawings in which:

FIG. 6 is a top plan view of a seed pocket 610 of an exemplary seed metering disc 600.

DETAILED DESCRIPTION

Figure 1:
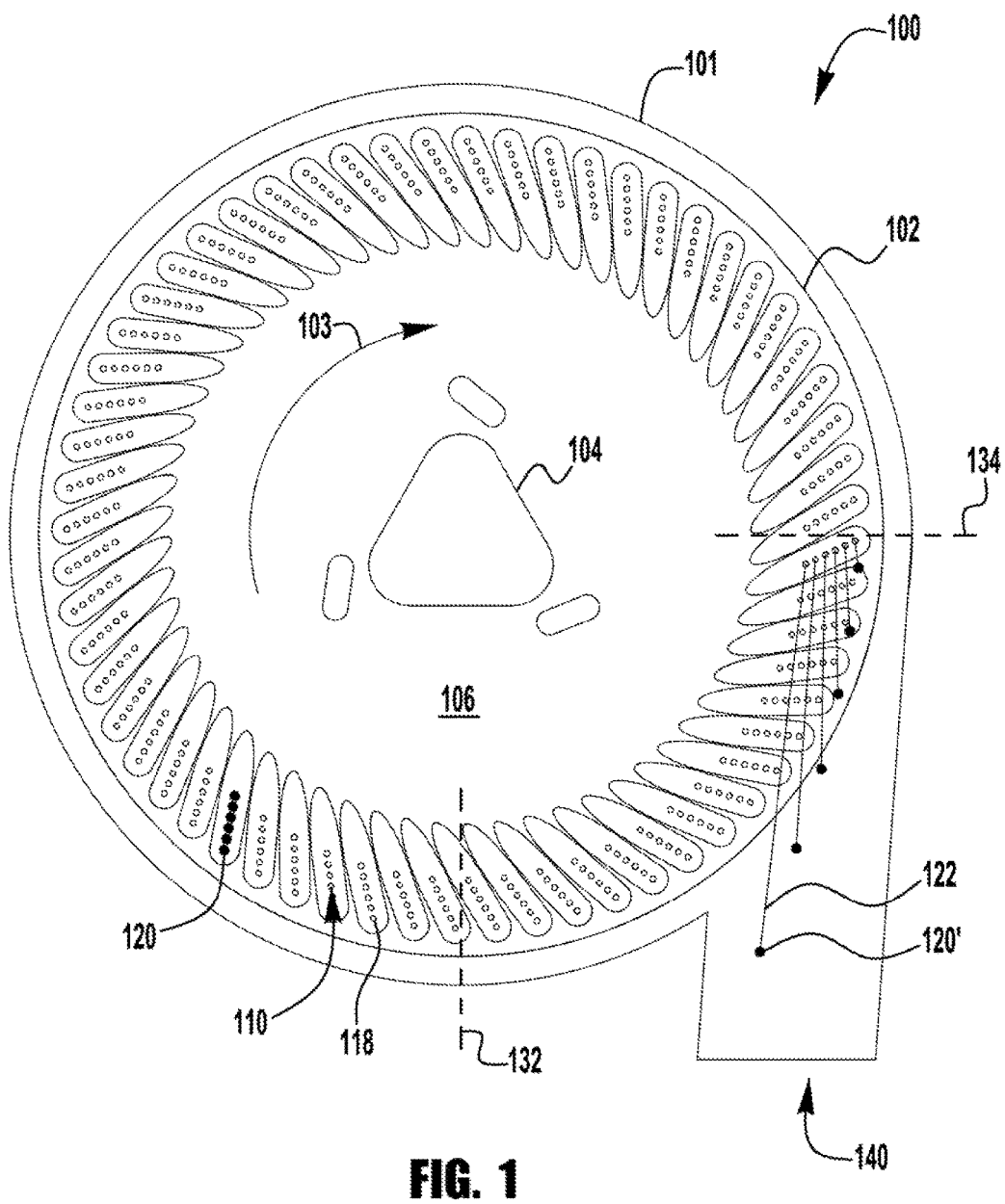
FIG. 1 is a front view of an exemplary seed metering system.

In many agricultural areas, large planters equipped with numerous row units are used to plant crop fields. The row units follow the planter and discharge seeds into the soil at a selected distribution determined by the type of seed being planted. To ensure uniformity and proper distribution throughout the field, seed meters are attached to the row units. Seed meters discharge seeds at a rate determined by the speed of the planter and the desired spacing of the seeds.

Large seed reservoirs store the seeds as the planters move across the crop fields. Seeds are released from the seed reservoirs and are evenly dispersed between the row units. The seeds travel down the row unit and are discharged into a seed meter. Seed meters typically employ rotating discs with pockets or channels to pick up seeds from the inlet of the seed meter to be discharged onto the ground through a seed tube. Various brushes, spring loaded fingers, vacuum pressure, and/or any other suitable means are employed to retain seeds in the pockets or channels of the disc as it rotates through the meter.

A seed metering disc is typically rotated in a substantially vertical plane. Seeds enter the meter and are picked up by the disc near the bottom of the rotation and are released after approximately three quarters of a rotation such that they travel vertically downwards toward the ground. In other words, in a clockwise rotating disc, the seeds are picked up at the 6 o'clock position and are released near the 3 o'clock position. The rotational speed of the disc determines the rate at which seeds are distributed, and the rotational speed of the disc can be varied based on the changing speed of the row unit over the ground. For example, to maintain uniform spacing of seeds during a turn, seed meters in row units toward the outside of the turn will need to distribute seeds more frequently than those on row units near the inside of the turn. In some seed meters, a gear box may be used with different seed metering discs to vary the rotational speed of the disc for different seed types.

In a vacuum seed meter the seed metering disc includes one or more vacuum openings in each of its one or more pockets. A vacuum pump is used to generate a low pressure region on a portion of a back side of the disc. The vacuum openings in each of the one or more pockets of the disc are in fluid communication with this low pressure region, thereby creating a pressure differential from the front side to the back side of the disc. Seeds in the pockets of the disc are held in the pockets by a retention force that results from the difference in pressure between the front and back sides of the disc. As the disc rotates, pockets move in and out of the low pressure region so that the retention force holds seeds in a pocket for only a portion of a full rotation of the disc. When a pocket moves out of the low pressure region, the reduced retention force, which, in some embodiments may go to zero, allows the seed or seeds in that pocket to be released from the disc. The location of this release can be altered in different embodiments, for example, by changing the location and/or shape of the end of the low pressure region, to determine a seed trajectory as the seed is discharged into a seed tube, and ultimately lands on the ground.

In some crops, seeds will germinate and grow best if they are planted one at a time and spaced apart in the soil. The process of distributing one seed at a time from a large quantity of seeds is called singulation. When distributing seeds one at a time, pockets and vacuum openings in the seed disc are typically sized to retain a single seed type of a particular size and deliver it to the soil at a fixed point in the rotation of the seed disc. See, e.g., U.S. Pat. Nos. 5,058,766; 6,634,522. Due to the design of the pockets and vacuum openings, seed metering discs will only distribute seeds properly if the seeds are of the size the seed discs are designed to handle. Therefore, when planting more than one type of crop, and thus using different seed sizes, more than one set of seed metering discs must be purchased and alternatively installed to allow for proper seed metering during singulation. Using mismatched seed discs and seeds may cause some pockets to not pickup seeds, or cause seeds to slip from the seed pockets at various points during seed disc rotation.

When planting other crops, particularly those with smaller seeds, seeds do not need to be singulated, but are spread out evenly over a given area. For example, some seeds may grow best when about 4 pounds of seeds are planted per acre of land, while others may grow properly when about 150 pounds of seeds are planted per acre. Varying sizes of the seeds can further contribute to this variation. Seeds may range in quantity from about 1,800 seeds per pound up to about 1,300,000 seeds per pound. In some situations, a mixture of seeds is planted, such as, for example, when planting cover crops. When planting a mixture of seeds, the seed meter must be capable of distributing the mixture evenly, so that the mixture of seed types or sizes is not significantly different from the inlet of the meter to the outlet of the meter. In other words, a seed meter used with a mix of seeds should distribute seeds in the same proportion as they were found in the bulk mixture. Prior seed metering discs designed for singulation of a particular seed type in a vacuum seed meter will not function properly in these situations. An exemplary seed metering disc as described below may be used with a variety of seeds, each having different sizes, and with mixtures of seeds.

Figure 1A:
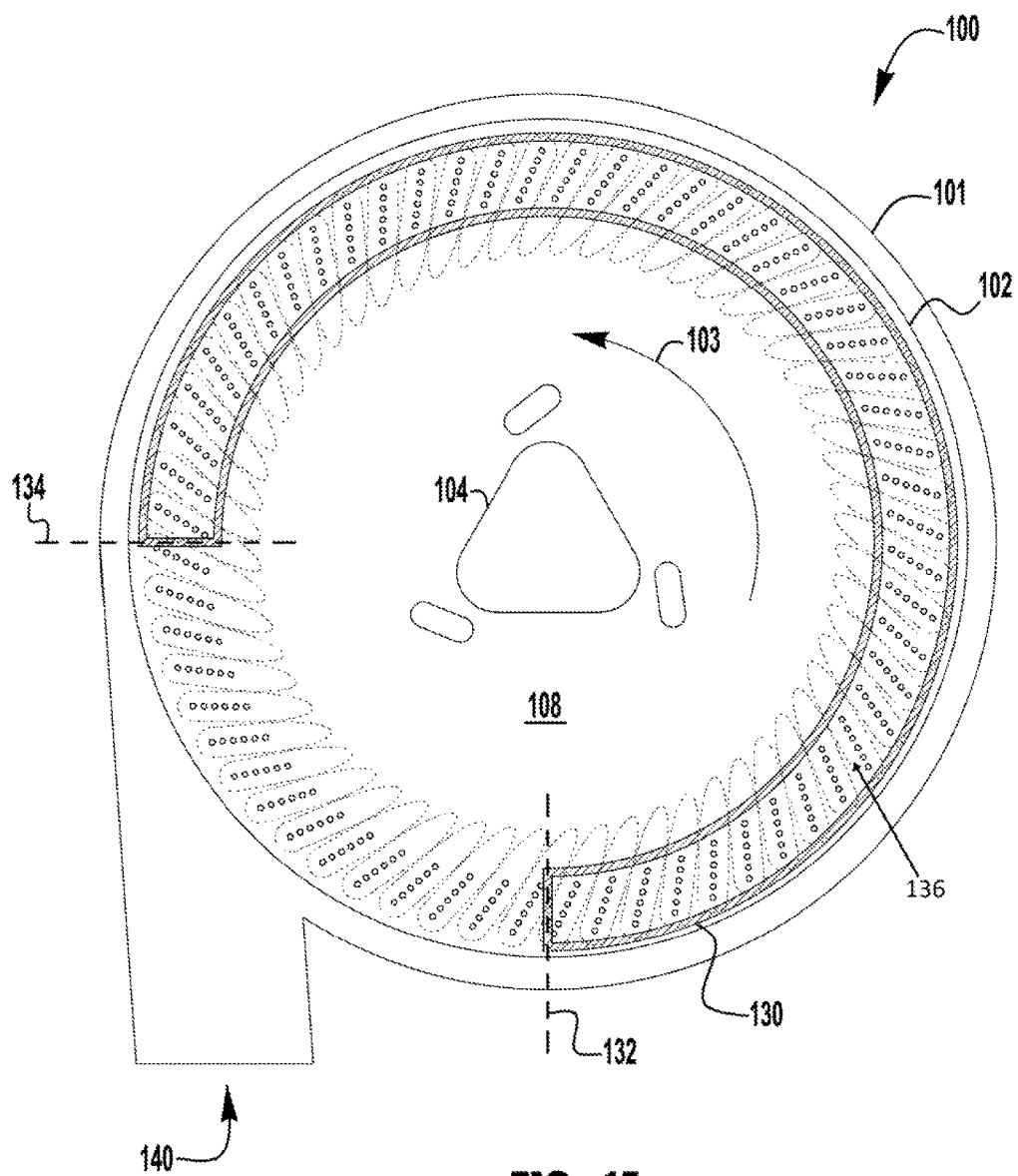
FIG. 1A is a back view of an exemplary seed metering system.

Turning now to FIGS. 1 and 1A, an exemplary embodiment of a vacuum seed meter 100 is shown. The seed meter 100 includes a housing 101 and a seed metering disc 102 that has a front side 106 and a back side 108. A plurality of seed pockets 110 are disposed in the front side 106 of the disc 102 proximate the perimeter of the disc 102. The housing 101 includes an inlet opening (not shown) that allows seeds 120 to enter the meter 100. Seeds 120 entering the meter 100 are carried through the meter 100 in pockets 110 of the disc 102 until they are discharged into a seed chute 140.

A mounting portion 104 of the seed metering disc 102 is rotatably assembled to the housing 101. The disc 102 may be rotatably assembled to the housing 101 in any way, such as, for example, with an axle, an annular groove, ball bearings, air bearings, or any other means of allowing the disc 102 to rotate within the housing 101. A motor (not shown) or other device rotates the disc 102 in the direction indicated by arrow 103, that is, in the clockwise direction when facing the front side 106 of the disc 102. The motor may rotate the disc 102 by rotating the mounting portion 104, engaging a track or gear teeth on one or both sides 106, 108 of the disc 102, or by engaging the outer diameter of the disc 102 in some way. The disc 102 is rotated in a substantially vertical plane in the illustrated embodiment, but may be rotated in another orientation and/or direction in a different seed meter.

A seal member 130 surrounds a low pressure region 136 on the back side 108 of the disc 102. The air pressure in the low pressure region 136 is reduced from atmospheric pressure, for example, by using a vacuum pump (not shown) connected to the seed meter 100. The seal member 130 contacts the back side 108 of the disc 102 to form a seal between the low pressure region 136 and the interior of the housing 101 which is generally at atmospheric pressure. The low pressure region 136 extends angularly from a pickup location 132 to a release location 134. During operation of the seed meter 100, the disc 102 rotates while the seal member 130 remains stationary so that the pickup and release locations 132, 134 remain fixed relative to the housing 101 of the seed meter 100. In the illustrated embodiment the low pressure region 136 is semi-annular in shape and extends angularly through about three quarters of a circle. The low pressure region 136 is located opposite the pockets 110 on the front side of the disc 102 and is proximate the perimeter of the disc 102. The low pressure region 136 may be any shape at any location on the back side of the seed metering disc, depending on the desired location of the pockets on the front side of the disc.

Each pocket 110 includes one or more vacuum openings 118 that are in fluid communication with the pockets 110 on the front side 106 of the disc 102 and the back side 108 of the disc 102. When a pocket 110 moves into the low pressure region 136 a pressure differential is created across the vacuum openings 118. A retention force in each hole is defined as the pressure difference from the front side 106 to the back side 108 of the disc 102 divided by the area of a particular vacuum hole 118. Seeds 120 are held in pockets 110 with this retention force. When a pocket 110 holding seeds 120 moves out of the low pressure region 136 the pressure equalizes across the openings 118 and the retention force goes to zero, releasing the seeds 120. The diameter of the openings 118 and the spacing 119 may be different in different embodiments of the seed meter 100 to increase or decrease the retention force holding seeds 120 in the pockets 110.

During operation of the seed meter 100, seeds 120 enter the meter 100 through an inlet opening (not shown) in the housing 101 and encounter the front side 106 of the rotating seed metering disc 102. Seeds 120 are collected by the pockets 110 in the front side 106 of the disc 102 as they move through the accumulated seeds 120. Brushes (not shown) attached to the housing 101 help to gather the seeds 120 into the pockets 110 and vacuum openings 118 in the front side 106 of the disc 102. As pockets 110 in the rotating disc 102 move across the pickup location 132 and into low pressure region 136 seeds 120 are retained against the vacuum openings 118 by the retention force in each opening 118. Additional brushes (not shown) attached to the housing 101 remove seeds 120 from the pockets 110 that have not been captured by the retention force to prevent extra seeds from being distributed by the seed meter 100.

Captured seeds 120 travel around the seed meter 100 in the pockets 110 and are held in place by the retention force described above. As the pockets 110 cross the release location 134 and leave the low pressure region 136, the retention force goes to zero and the seeds 120 are released. Released seeds 120' fall downward through the seed chute 140 and onto the ground at the desired planting location. When falling, the seeds follow a substantially downward trajectory 122. The trajectory 122 of the released seeds can be altered based on the location and timing of the release of the seeds from the pocket, as shown by the slightly varied trajectories in FIG. 1. As can be seen in FIG. 1, the pockets 110 are slanted such that the opening 118 closest to the center of the disc 102 passes the release location 134 and releases its seed before other openings 118 in the same pocket 110. The seed from the next hole follows closely behind, and so on until all seeds in the same pocket are released, thereby spacing out the seeds from a single pocket. An optional brush or ejector wheel (not shown) may then be used to clean out any debris from the holes before new seeds are picked up for distribution.

Figure 2:
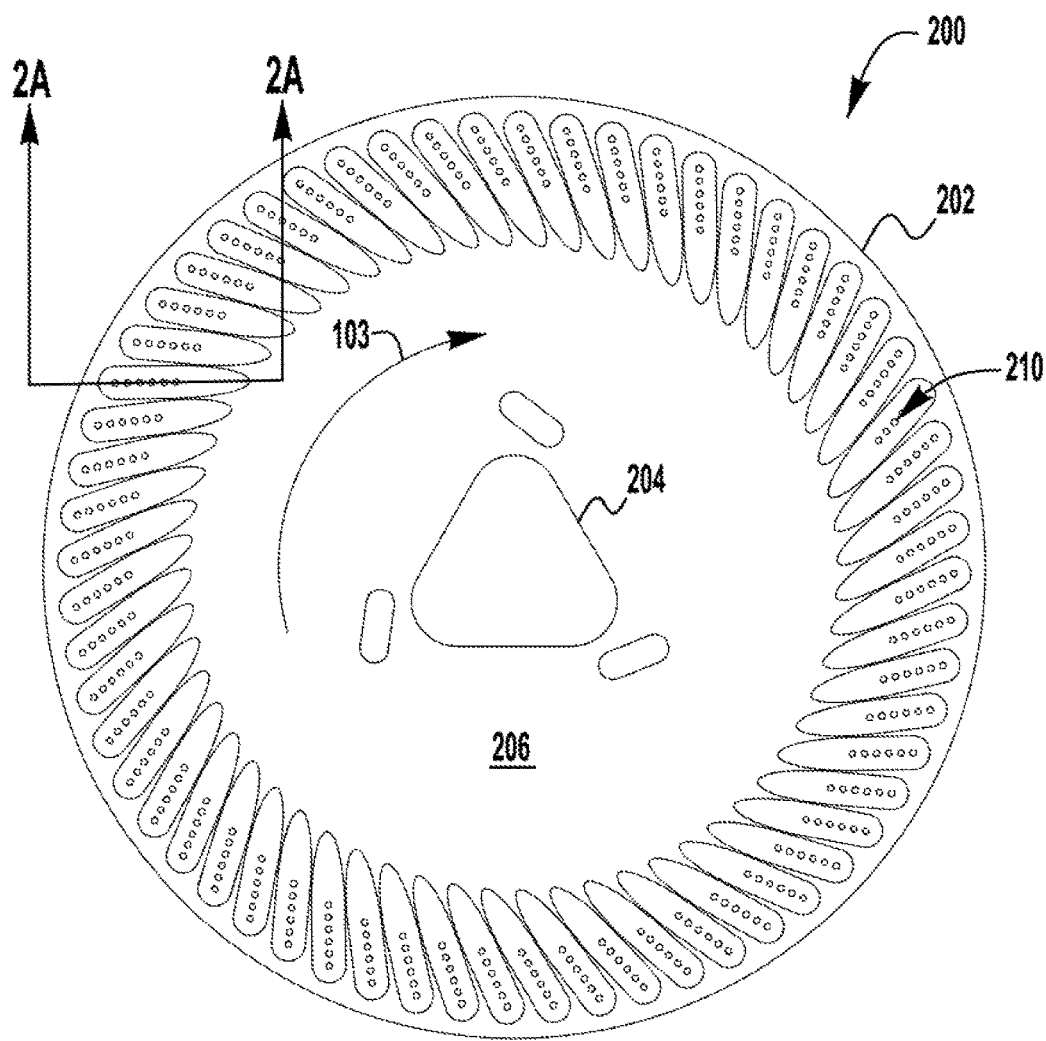
FIG. 2 is a front view of a first embodiment of an exemplary seed metering disc.
Figure 3:
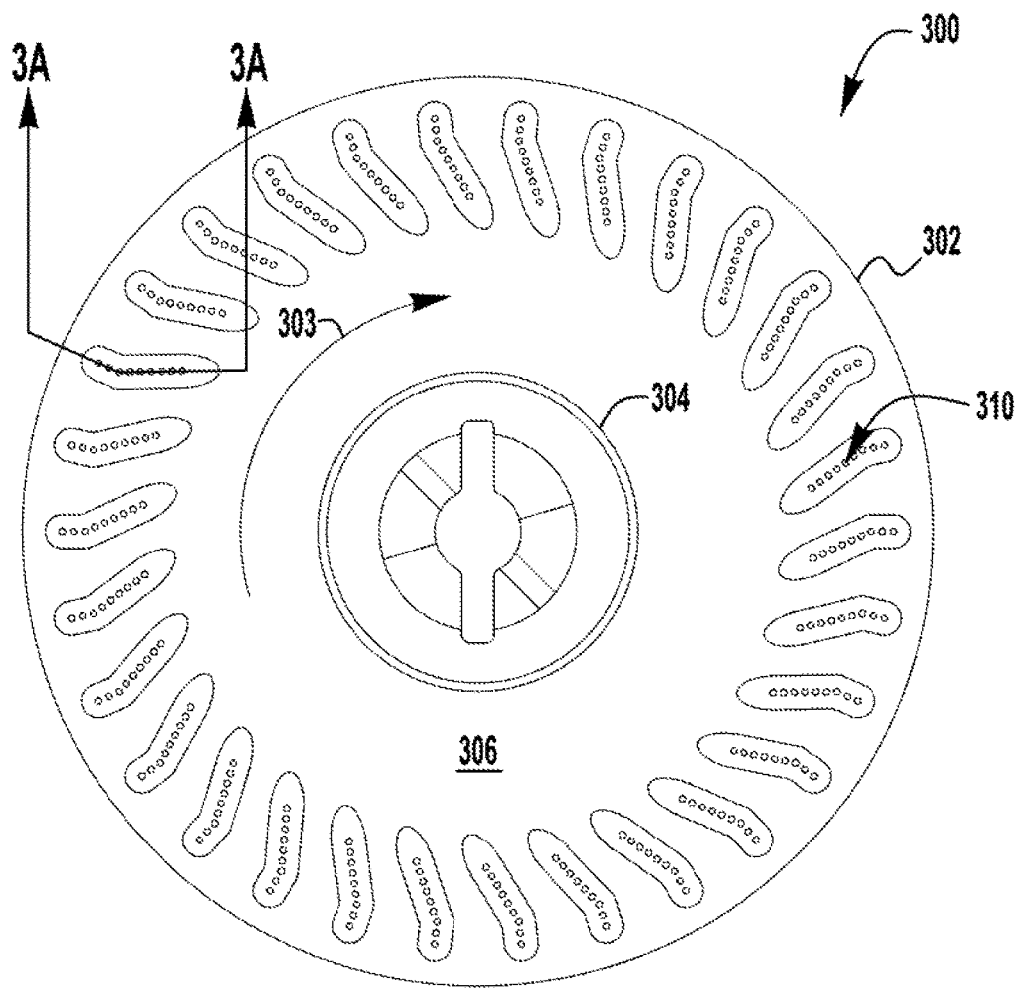
FIG. 3 is a front view of a second embodiment of an exemplary seed metering disc.

Referring now to FIGS. 2 and 3, exemplary seed metering discs 200, 300 are shown. These discs demonstrate how the pockets and mounting portions may be configured for use in commercially available seed metering systems. For example, seed metering disc 200 is configured for use in a Kinze Manufacturing 4000 series vacuum seed meter, and seed metering disc 300 is configured for use in a John Deere Pro-Series vacuum seed meter. Exemplary seed metering discs made for seed meters of other manufacturers may vary in diameter, pocket position, thickness, and/or include other features to operate properly within different seed meters. Exemplary seed metering discs are also suitable for use with a variety of seeds, such as, for example, clover, sorghum, wheat, oats, rice, sesame seeds, sunflower, canola, hairy vetch, sun hemp, triticale, rye grasses, radish, corn, rye, cereal rye, teff grass, mil, wheat, oats, canola, flax, cow peas, and the like.

Figure 2A:
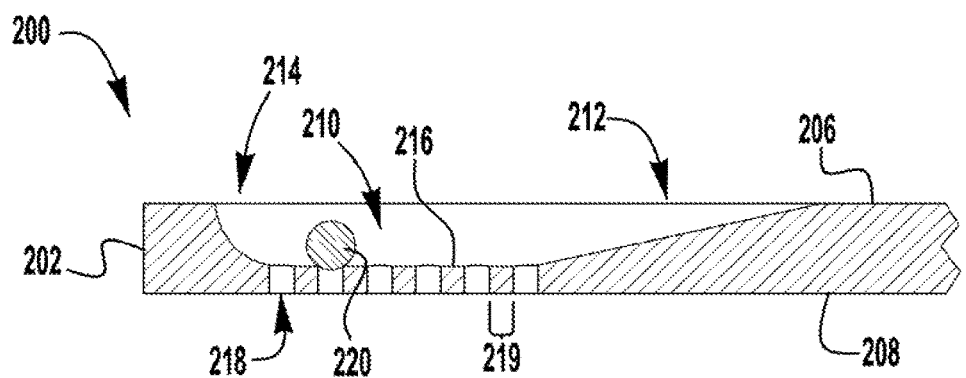
FIG. 2A is a cross-sectional view of the seed metering disc of FIG. 2 taken along the line 2A.

FIGS. 2 and 2A illustrate an exemplary seed metering disc 200. Seed metering disc 200 has a front side 206 and back side 208. A plurality of seed pockets 210 are disposed in the front side 206 of the disc 200 proximate the perimeter. A mounting portion 204 in the center of the disc 200 is configured to attached the disc 200 to a Kinze Manufacturing EdgeVac series vacuum seed meter.

A cross-section of one of the seed pockets 210 is shown in FIG. 2A. Each seed pocket 210 has an inner end 212 nearer to the center of the disc 200 and an outer end 214 nearer to the perimeter of the disc 200. The inner end 212 of the seed pocket 210 tapers gradually to the floor 216 of the seed pocket 210 to help guide seeds 220 into the pocket 210 during use. The outer end 214 of the seed pocket 210 is rounded to direct seeds 220 out of the pocket 210 after they are released. Each seed pocket 210 has one or more vacuum openings 218 in the floor 216 of the pocket 210 that are in fluid communication with the back side 208 of the disc 200. The spacing 219 between the openings 218 ensures that each opening 218 has enough room to hold a single seed 220. Some seeds that have a more oblong shape may be held by more than one opening 218. The width, depth, and shape of each seed pocket 210, and the size, shape, spacing, and number of vacuum openings 218 in each pocket are selected to accommodate a range of seeds having different shapes and sizes. In one embodiment, the vacuum openings 218 have a diameter of between about 0.001 inches and about 0.500 inches.

Figure 3A:
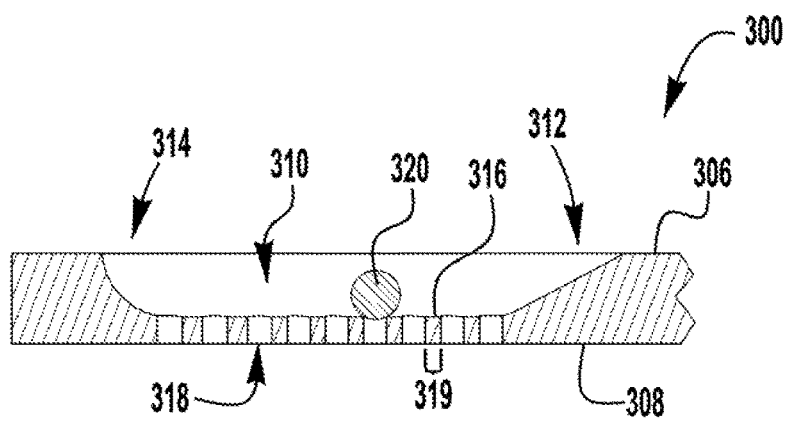
FIG. 3A is a cross-sectional view of the seed metering disc of FIG. 3 taken along the line 3A.

FIGS. 3 and 3A illustrate another exemplary seed metering disc 300. Seed metering disc 300 has a front side 306 and back side 308. A plurality of seed pockets 310 are disposed in the front side 306 of the disc 300 proximate the perimeter. A mounting portion 304 in the center of the disc 300 is configured to attached the disc 300 to a John Deere Pro-Series vacuum seed meter.

A cross-section of one of the seed pockets 310 is shown in FIG. 2A. Each seed pocket 310 has an inner end 312 nearer to the center of the disc 300 and an outer end 314 nearer to the perimeter of the disc 300. The inner end 312 of the seed pocket 310 tapers gradually to the floor 316 of the seed pocket 310 to help guide seeds 320 into the pocket 310 during use. The outer end 314 of the seed pocket 310 is rounded to direct seeds 320 out of the pocket 310 after they are released. Each seed pocket 310 has one or more vacuum openings 318 in the floor 316 of the pocket 310 that are in fluid communication with the back side 308 of the disc 300. The spacing 319 between the openings 318 ensures that each opening 318 has enough room to hold a single seed 320. Some seeds that have a more oblong shape may be held by more than one opening 318. The width, depth, and shape of each seed pocket 310, and the size, shape, spacing, and number of vacuum openings 318 in each pocket are selected to accommodate a range of seeds having different shapes and sizes. In one embodiment, the vacuum openings 218 have a diameter of between about 0.001 inches and about 0.010 inches.

Figure 4A:
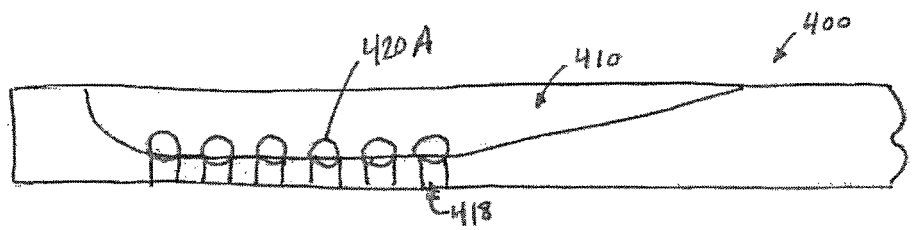
FIGS. 4A, 4B, 4C, 4D, 4E, 4F, and 4G are cross-sectional views of seed pockets 410 of an exemplary seed metering disc 400 holding different size and shape seeds.
Figure 4B:
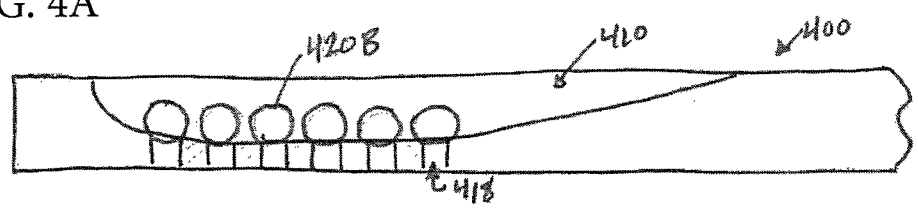
Figure 4C:
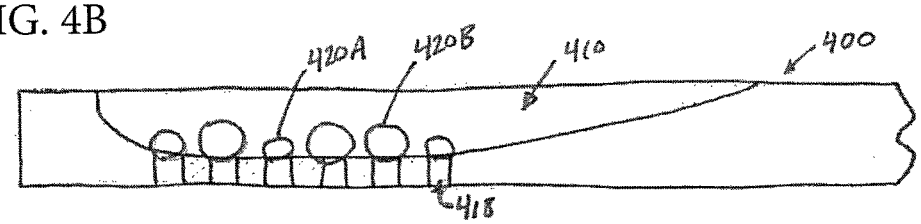
Figure 4D:
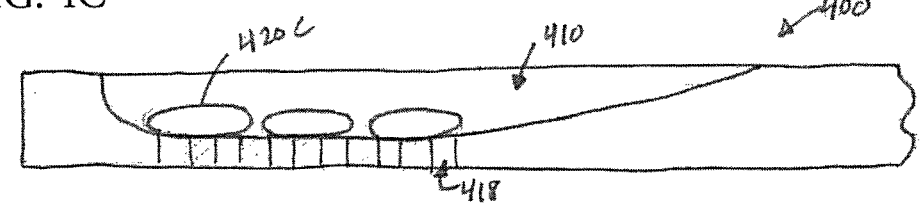
Figure 4E:
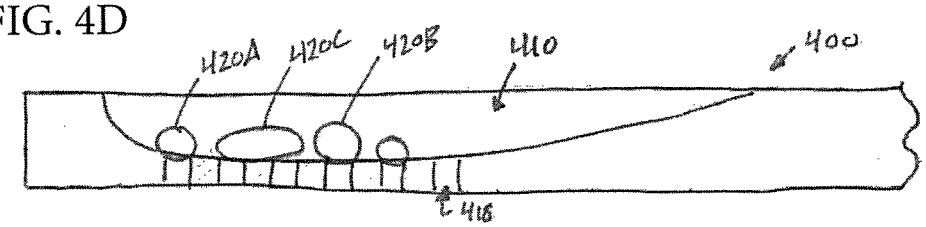
Figure 4F:
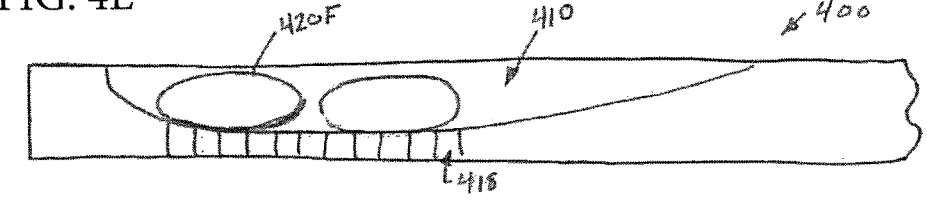
Figure 4G:
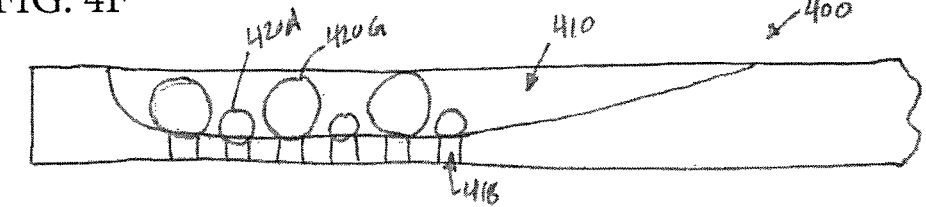
Figure 5A:
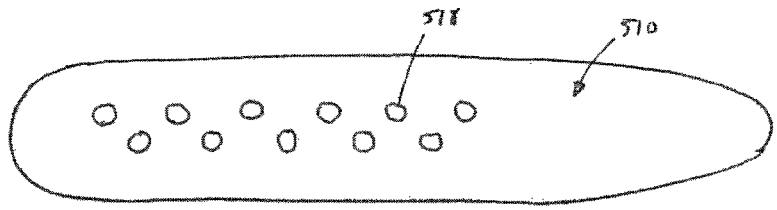
FIGS. 5A, 5B, 5C, 5D, 5E, 5F, and 5G are top plan views of different configurations of openings 518 in seed pockets 510 of an exemplary seed metering disc 500.
Figure 5B:
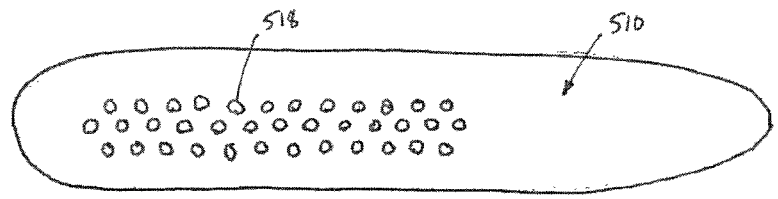
Figure 5C:
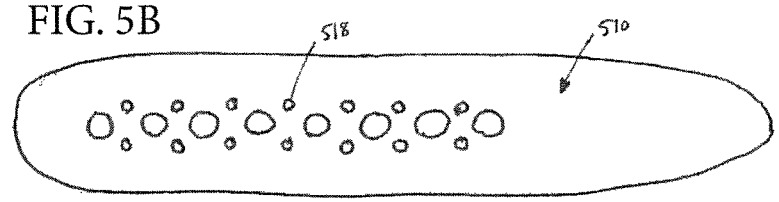
Figure 5D:
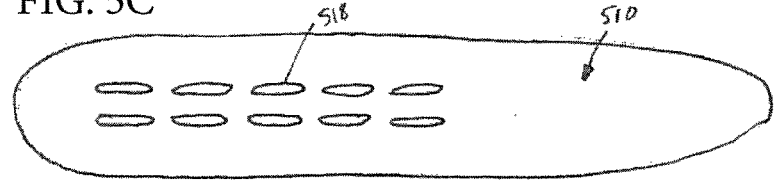
Figure 5E:
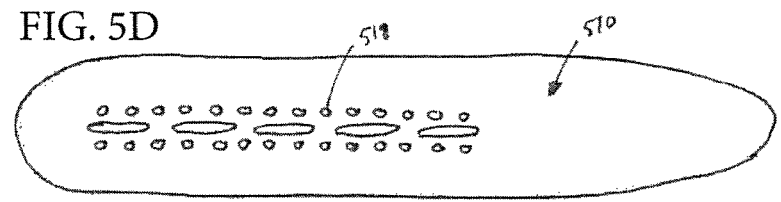
Figure 5F:
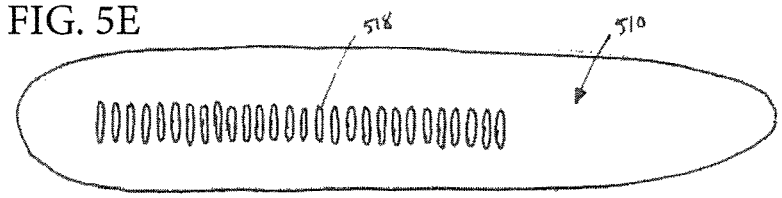
Figure 5G:
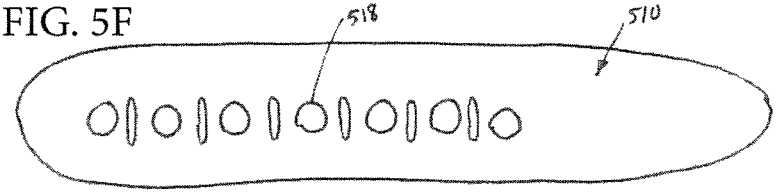
Figure 6A:
FIGS. 6A, 6B, 6C, and 6D are top plan views of different configurations of seed pockets 610 of an exemplary seed metering disc 600.
Figure 6B:
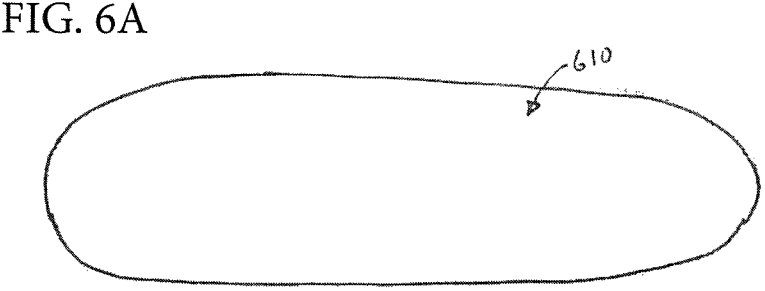
Figure 6C:
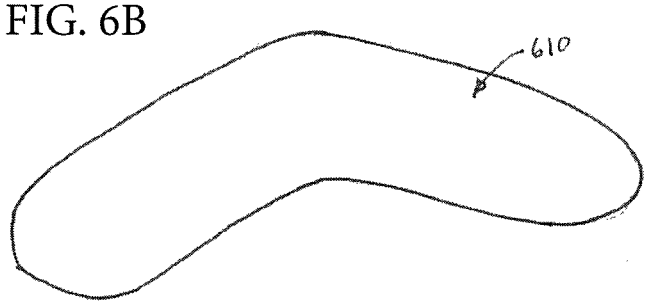
Figure 6D:
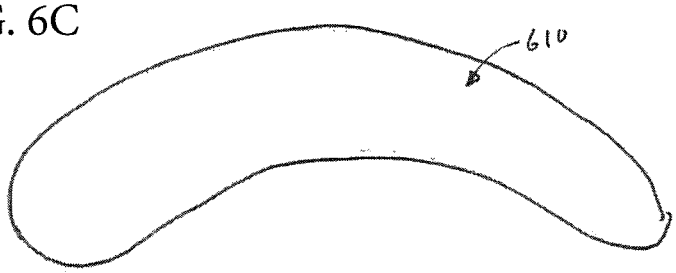

FIGS. 4A to 4G show cross-sectional views of how different size and shape seeds may be held in pockets 410 of an exemplary seed metering disc 400. FIG. 4A illustrates small seeds 420A being held in each of the openings 418 of the pocket 410. The size of the openings 418 is selected to ensure that the small seeds 420A are not pushed through the openings 418 disc 400 by the retention force on the seeds. FIG. 4B shows medium sized seeds 420B being held in each of the openings 418 of the pocket 410. The openings 418, though small enough to prevent small seeds 420A from being pushed through the disc 400, still generate enough retention force to hold medium seeds 420B. FIG. 4C shows that small seeds 420A and medium seeds 420B can be held in the pocket 410 at the same time. FIG. 4D illustrates that oblong seeds 420D can also be retained within pocket 410. As can be seen in FIG. 4D, oblong seeds 420D may span more than one opening 418, either fully or partially, and are sufficiently retained even when partially covering an opening 418. FIG. 4E illustrates a mixture of small, medium, and oblong seeds 420A, 420B, 420D retained in pocket 410 at the same time. One of the openings 418 of pocket 410 in FIG. 4E is empty to show that the disc 400 can still function even if the openings 418 are not all obstructed. FIGS. 4F and 4G illustrate larger oblong seeds 420F and larger round seeds 420G also being retained within pocket 410. In FIGS. 4A to 4G, seeds 420A, 420B, 420D, 420F, 420G are properly retained within pockets 410 when openings 418 are partially covered or are not covered at all, and also when a mixture of seed sizes are used. The size of the openings 418 may be smaller in different embodiments to properly retain smaller seeds.

FIGS. 5A to 5G show top plan views of different configurations of openings 518 in the pockets 510 of an exemplary seed metering disc 500. An exemplary seed metering disc 500 may have the same configuration of openings 518 in each pocket 510, or may have different configurations in different pockets. In some embodiments, some pockets may be configured to be more likely to retain smaller seeds, while other pockets may be configured to be more likely to retain larger seeds. In some other embodiments, some pockets may be more likely to retain oblong seeds, while other pockets may be configured to be more likely to retain round seeds. The different pocket and opening configurations may be arranged to provide a desired mixture of seeds distributed from the seed meter.

FIG. 6 shows a top plan view of an exemplary pocket 610 in an exemplary metering disc 600. The pocket 610 is generally straight and aligned along a pocket axis 611. A pocket angle 612 is measured between a tangent 603 of a perimeter 602 of the disc 600 and the axis 611 of the pocket 610. As discussed above, the pocket angle 612 may be changed in different embodiments to change the timing in the release of adjacent seeds held within the pocket 610. The pocket 610 also has a length 613 and width 614 that may also be changed in different embodiments to improve retention of different mixes of seed sizes and shapes. As can be seen in FIG. 3, pockets of the disc do not have to be straight. FIGS.

6A to 6D illustrate exemplary embodiments of different configurations of the pocket 610 to show some of the many ways that the pocket shape can vary in different embodiments of the metering disc 600. In some embodiments, the pockets may also have a branching shape; that is, the pocket may start as a single channel nearer to the outer diameter of the disc and branch into two or more channels on the inner end of the pocket. In some other embodiments, the pocket may start as a single channel near the interior of the disc that splits into two or more channels near the outer diameter of the disc.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

What is claimed is:

1. A seed metering system comprising:
   a seed meter; and
   a metering disc having:
      a front side and a back side;
      one or more elongated pockets in the front side; and
      at least two openings in each of the one or more elongated pockets, the at least two openings being in fluid communication with the back side;
   a low pressure region in fluid communication with the back side of the metering disc;
   wherein the pockets are configured to receive at least two different seed types.

2. The seed metering system of claim 1, wherein the disc can be used with seeds selected from the group of: corn, rye, cereal rye, tie grass, mil, wheat, oats, canola, flax, and cow peas.

3. The seed metering system of claim 1, wherein the pockets are configured to receive at least two different see types at the same time.

4. The seed metering system of claim 1, wherein at least two openings comprise openings of at least two different sizes.

5. A seed metering disc comprising:
   a front side and a back side;
   one or more elongated pockets in the front side;
   at least two openings in each of the one or more elongated pockets, the at least two openings being in fluid communication with the back side;
   wherein the pockets are configured to receive at least two different seed types.

6. The seed metering disc of claim 5, wherein the disc can be used with seeds selected from the group of: corn, rye, cereal rye, tie grass, mil, wheat, oats, canola, flax, and cow peas.

7. The seed metering disc of claim 5, wherein the pockets are configured to receive at least two different seed types at the same time.

8. The seed metering disc of claim 5, wherein the at least two openings comprise openings of at least two different sizes.

9. A seed metering system comprising:
   a metering disc having:
      a front side and a back side;
      one or more elongated pockets in the front side; and
      a plurality of openings in each of the one or more elongated pockets, the plurality of openings being in fluid communication with the back side;
   a low pressure region in fluid communication with the back side of the metering disc;
   wherein the pockets are configured to receive at least two different seed types.

10. The seed metering system of claim 9 wherein the one or more elongated pockets are linear.

11. The seed metering system of claim 9 wherein a first portion of the one or more elongated pockets extends along a first axis and a second portion of the one or more elongated pockets extends along a second axis that intersects with the first axis.

12. The seed metering system of claim 9 wherein the plurality of openings in each pocket includes at least three openings.

13. The seed metering system of claim 9 wherein the plurality of openings in each pocket includes at least four openings.

14. The seed metering system of claim 9 wherein the plurality of openings in each pocket includes at least five openings.

15. The seed metering system of claim 9, wherein the pockets are configured to receive at least two different seed types at the same time.

16. The seed metering system of claim 9, wherein the plurality of openings comprise openings of at least two different sizes.

17. The seed metering system of claim 9 wherein the one or more elongated pockets are the same size.

18. The seed metering system of claim 9 wherein the one or more elongated pockets have an inner end with a shallow sloping bottom surface.

19. The seed metering system of claim 18 wherein the one or more elongated pockets have an outer end with a substantially constant depth.

20. The seed metering system of claim 19 wherein at least two openings are located in the outer end.

\* \* \* \* \*